(12) United States Patent
Englert et al.

(10) Patent No.: US 10,913,573 B2
(45) Date of Patent: Feb. 9, 2021

(54) COLLAPSIBLE CONTAINER

(71) Applicant: Rehrig Pacific Company, Los Angeles, CA (US)

(72) Inventors: Travis J. Englert, Brea, CA (US); William P. Apps, Alpharetta, GA (US); Dane Gin Mun Kalinowski, Foothill Ranch, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 82 days.

(21) Appl. No.: 15/815,138

(22) Filed: Nov. 16, 2017

(65) Prior Publication Data

US 2018/0327138 A1 Nov. 15, 2018

Related U.S. Application Data

(60) Provisional application No. 62/423,728, filed on Nov. 17, 2016.

(51) Int. Cl.
*B65D 21/08* (2006.01)
*B65D 6/18* (2006.01)
*B65D 6/16* (2006.01)

(52) U.S. Cl.
CPC ............ *B65D 21/086* (2013.01); *B65D 11/18* (2013.01); *B65D 11/1833* (2013.01)

(58) Field of Classification Search
CPC .. B65D 21/00–086; B65D 11/00–1833; B65D 1/265; B65D 1/28; B65D 1/30;
(Continued)

(56) References Cited

U.S. PATENT DOCUMENTS 2,780,381 A 2/1957 Coit
3,360,180 A 12/1967 Venturi
(Continued)

FOREIGN PATENT DOCUMENTS

DE 3500427 7/1986
DE 9203114 5/1992
(Continued)

OTHER PUBLICATIONS

Disclosure of Pre-Critical Date Activity, see attached.
New Zealand Examination Report 1 for application No. 737433 dated Aug. 6, 2020.

*Primary Examiner* — Kareen K Thomas
(74) *Attorney, Agent, or Firm* — Carlson, Gaskey & Olds, P.C.

(57) ABSTRACT

A container includes a base and a wall secured to the base and movable between an upright position and a collapsed position on the base. The wall including a recess and a pair of pins projecting into the recess. A hinge member is pivotably secured to the pins in the recess in the wall. The hinge member includes a pair of opposed bases connected by a plurality of curved walls. The bases each include an aperture receiving one of the pair of pins in the recess. In one embodiment, the hinge member pivotably secures the wall to the base. In another embodiment, the hinge member pivotably secured the wall to another wall such that the wall can pivot 270 degrees to leave that side of the container completely open.

20 Claims, 14 Drawing Sheets

(58) Field of Classification Search
CPC ............ B65D 5/36–3678; A47G 29/12; A47G 29/1201; A47G 29/1209; A47G 2021/002
USPC ...... 220/666, 9.2, 9.3, 667, 4.08, 4.16, 4.28, 220/592.27
See application file for complete search history.

(56) References Cited

U.S. PATENT DOCUMENTS

| | | | |
|---|---|---|---|
| 3,372,829 | A | 3/1968 | Averill |
| 3,835,792 | A | 9/1974 | Wharton |
| 3,981,410 | A | 9/1976 | Schurch |
| 4,023,698 | A | 5/1977 | Joseph |
| 4,043,476 | A | 8/1977 | Joseph |
| 4,406,380 | A | 9/1983 | Paige |
| 4,662,532 | A | 5/1987 | Anderson et al. |
| 4,674,647 | A | 6/1987 | Gyenge et al. |
| 4,765,480 | A | 8/1988 | Malmanger |
| 5,016,772 | A | 5/1991 | Wilk |
| 5,161,709 | A | 11/1992 | Oestreich |
| 5,199,592 | A * | 4/1993 | Reiland .............. B65D 11/1833 16/366 |
| 5,562,224 | A | 10/1996 | Pascal et al. |
| 5,660,291 | A | 8/1997 | Dash |
| 5,938,059 | A * | 8/1999 | Luburic ............. B65D 11/1833 220/4.32 |
| 6,015,056 | A | 1/2000 | Overholt et al. |
| 6,044,998 | A | 4/2000 | Schearer et al. |
| 6,056,177 | A | 5/2000 | Schneider |
| 6,098,827 | A | 8/2000 | Overholt et al. |
| 6,209,742 | B1 | 4/2001 | Overholt et al. |
| 6,290,081 | B1 | 9/2001 | Merey |
| 6,305,566 | B1 | 10/2001 | Pigott et al. |
| 6,601,724 | B1 | 8/2003 | Koefelda et al. |
| 6,691,885 | B2 | 2/2004 | Brown |
| 6,902,061 | B1 * | 6/2005 | Elstone ................. B65D 19/02 206/596 |
| 6,918,502 | B1 | 7/2005 | Overholt et al. |
| 7,011,225 | B2 | 3/2006 | Oster et al. |
| 7,264,122 | B2 | 9/2007 | Koefelda et al. |
| 7,896,184 | B2 | 3/2011 | Meers |
| 8,066,147 | B2 | 11/2011 | Meers et al. |
| 8,113,372 | B2 * | 2/2012 | Bellehumeur ....... B65D 90/022 220/7 |
| 8,863,971 | B2 | 10/2014 | Cavalcante et al. |
| 9,278,775 | B2 | 3/2016 | Meers et al. |
| 9,475,638 | B2 | 10/2016 | Cavalcante et al. |
| 2001/0035411 | A1 * | 11/2001 | Kofod .................. B65D 88/526 220/7 |
| 2002/0070215 | A1 | 6/2002 | Walsh et al. |
| 2003/0000950 | A1 | 1/2003 | Murakami et al. |
| 2004/0020821 | A1 | 2/2004 | Koefelda et al. |
| 2004/0200833 | A1 | 10/2004 | Dubois et al. |
| 2006/0231555 | A1 | 10/2006 | Smyers et al. |
| 2006/0260976 | A1 | 11/2006 | Apps |
| 2007/0158345 | A1 | 7/2007 | Booth et al. |
| 2008/0035717 | A1 * | 2/2008 | Turvey ............... B65D 43/0218 229/117.02 |
| 2009/0057320 | A1 | 3/2009 | Meers et al. |
| 2009/0134157 | A1 | 3/2009 | Meers |
| 2013/0001223 | A1 | 1/2013 | Cavalcante et al. |
| 2014/0251992 | A1 | 9/2014 | Cavalcante |
| 2015/0028027 | A1 | 1/2015 | Cavalcante et al. |
| 2016/0185487 | A1 | 6/2016 | Meers et al. |

FOREIGN PATENT DOCUMENTS

| | | |
|---|---|---|
| DE | 9305904 | 8/1993 |
| DE | 4319099 | 12/1994 |
| DE | 20101630 | 4/2001 |
| EP | 0690003 | 1/1996 |
| EP | 0785142 | 7/1997 |
| EP | 1225131 | 7/2002 |
| EP | 1524170 | 4/2005 |
| EP | 1935792 | 6/2008 |
| EP | 2062827 | 5/2009 |
| FR | 1227059 | 8/1960 |
| FR | 2810020 | 12/2001 |
| GB | 2357078 | 6/2001 |
| GB | 2360762 | 10/2001 |
| GB | 2431922 | 5/2007 |
| GB | 2449502 | 11/2008 |
| JP | 2007076655 | 3/2007 |
| WO | 9521773 | 8/1995 |
| WO | WO9840199 | 9/1998 |
| WO | 03008275 | 1/2003 |
| WO | 2006010311 | 2/2006 |
| WO | 2008145977 | 12/2008 |

* cited by examiner

FIG. 12 SIDE

FIG. 10 ISO

FIG. 13 TOP

FIG. 11 FRONT

COLLAPSIBLE CONTAINER

BACKGROUND

Many grocery goods, such as egg cartons, are shipped to stores in cardboard boxes. The goods are unloaded at the store and placed on shelves, such as refrigerator shelves. Unloading the goods requires extra labor and the cardboard sometimes is not recycled.

Some reusable plastic collapsible containers full of goods for sale can be placed directly onto the shelves. The consumers remove the product directly from the reusable container. The container may be a collapsible container, such that the walls of the container can be collapsed when empty, for efficient storage and transport.

SUMMARY

A container includes a base and a wall secured to the base and movable between an upright position and a collapsed position on the base. The wall includes a recess and a pair of pins projecting into the recess. A hinge member is pivotably secured to the pins in the recess in the wall. The hinge member includes a pair of opposed bases connected by a plurality of curved walls. The bases each include an aperture receiving one of the pair of pins in the recess.

In one embodiment, the hinge member pivotably secured the wall to another wall such that the wall can pivot 270 degrees to leave that side of the container completely open.

In another embodiment, the hinge member pivotably secures the wall to the base.

DETAILED DESCRIPTION OF A PREFERRED EMBODIMENT

Figure 1:
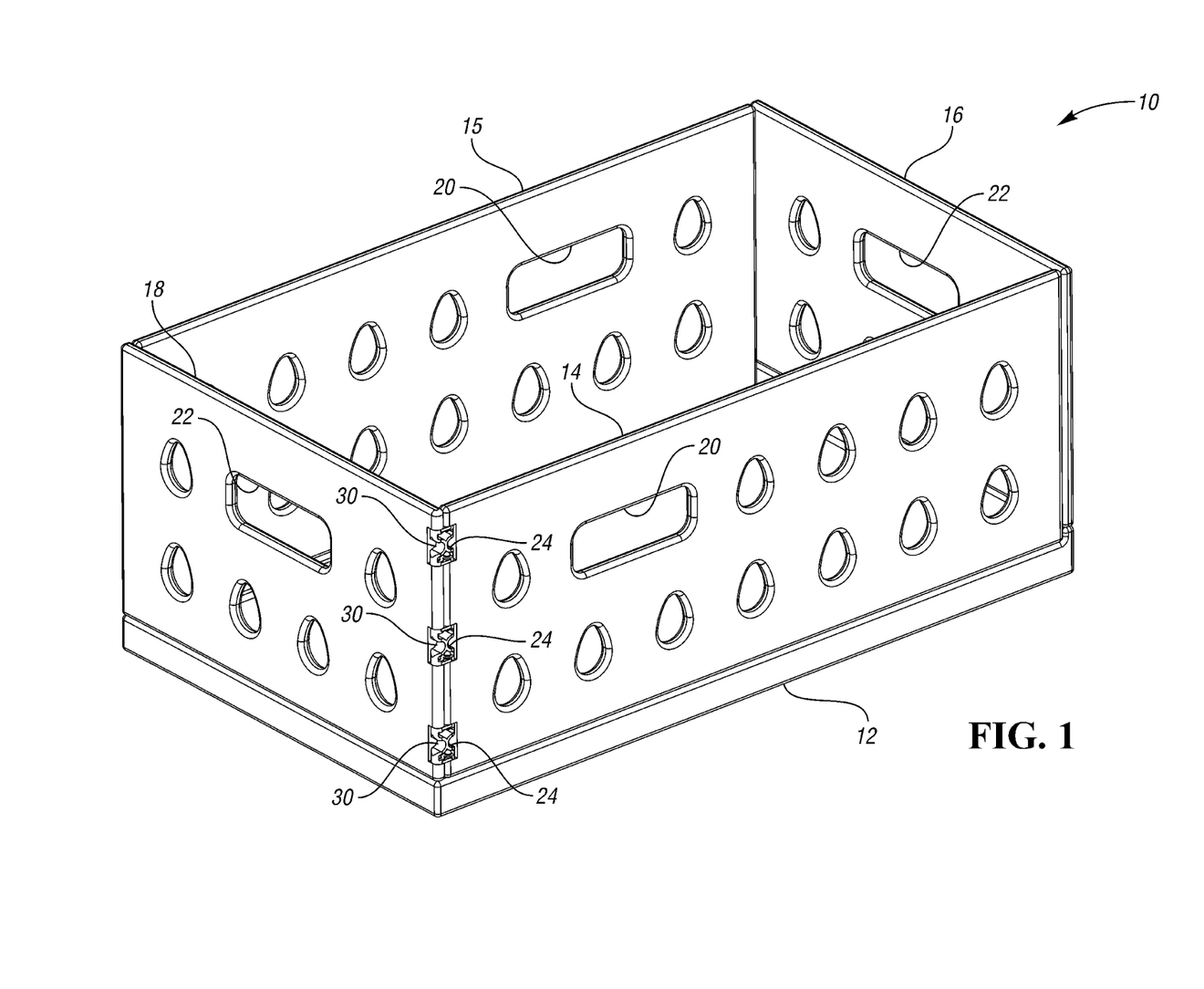
FIG. 1 is a perspective view of a container according to one embodiment.

A collapsible container 10 is shown in FIG. 1. The container 10 includes a base 12, first and second side walls 14, 15, rear wall 16 and front wall 18, each molded as a separate piece of plastic, such as by injection molding. The side walls 14, 15 and rear wall 16 are pivotably connected to the base 12 such that they can be collapsed onto the base 12 when empty to reduce volume for shipping and storing empty containers. Latches (not illustrated) selectively connect the side walls 14, 15 to the rear wall 16 and would selectively connect second side wall 15 to one edge of the front wall 18.

The other edge of the front wall 18 is connected to the first side wall 14 via hinges 24. Each hinge 24 includes a hinge member 30 connecting the first side wall 14 to the front wall 18. The front wall 18 is not connected to the base 12 by hinges as are the other walls 14, 15, 16.

The side walls 14, 15 include handle openings 20 offset from center. The handle opening 20 on the first side wall 14 is offset toward the front wall 18. The handle opening 20 on the second side wall 15 is offset toward the rear wall 16. The rear and front walls 16, 18 include handle openings 22, which in this example are centered on rear and front walls 16, 18.

Figure 2:
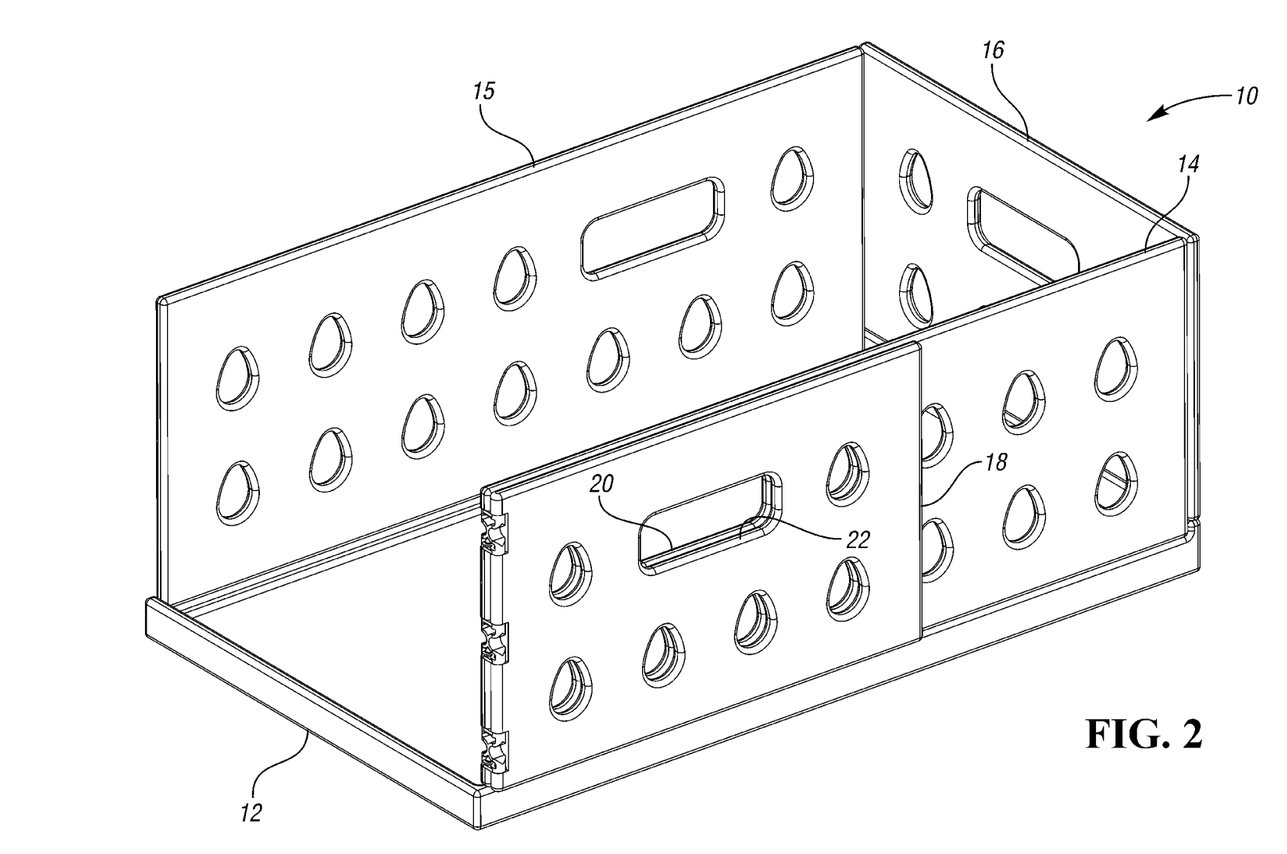
FIG. 2 shows the container of FIG. 1 with the end wall pivoted outward to a retracted position.
Figure 3:
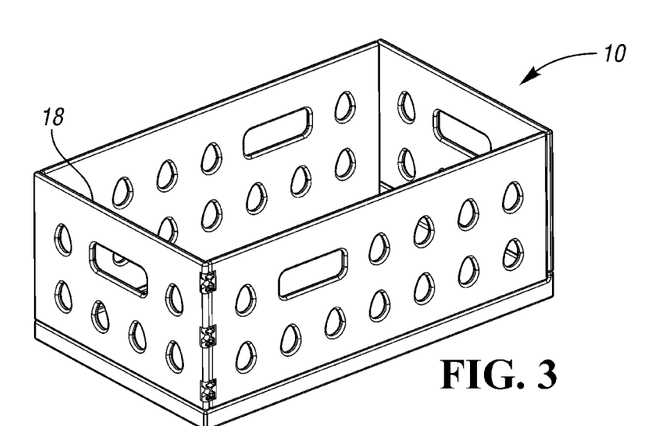
FIG. 3 shows a first step in moving the front wall of the container of FIG. 1 from the closed position to the retracted position.
Figure 4:
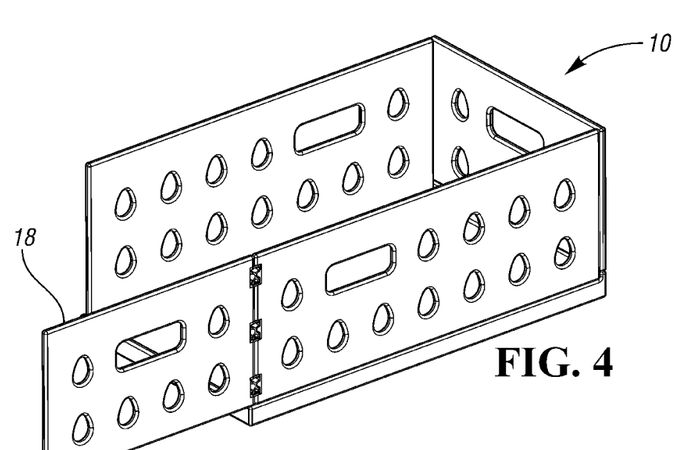
FIG. 4 shows a second step in moving the front wall of the container of FIG. 1 toward the retracted position.
Figure 5:
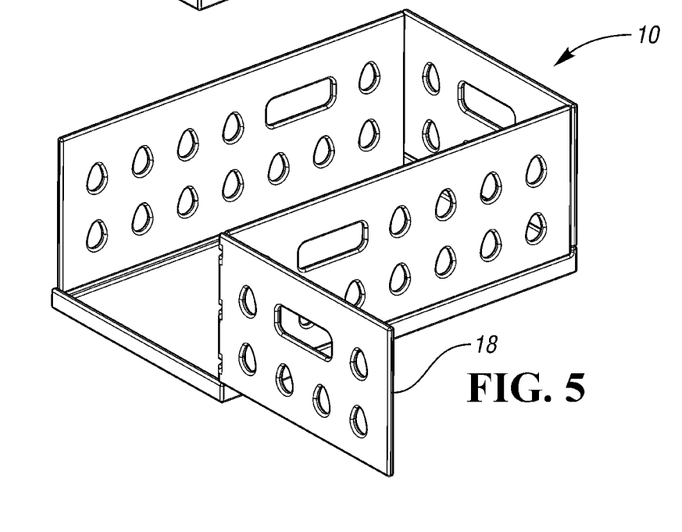
FIG. 5 shows a third step in moving the front wall of the container of FIG. 1 toward the retracted position.

Referring to FIG. 2, after releasing a latch (not shown) connecting the front wall 18 to the second side wall 15, the front wall 18 can be pivoted about the hinges 24 that connect it to the first side wall 14. The front wall 18 can be pivoted approximately 270 degrees to a retracted position where it abuts the outer surface of the first side wall 14 as shown. In this position, the handle opening 22 through the front wall 18 aligns with the handle opening 20 through the first side wall 14. This facilitates use of the handle openings 20, 22 when the front wall 18 is in this retracted position. In this position, customers can fully access the contents of the container 10 through the front of the container 10, i.e. there are no projections from the front edges of the side walls 14, 15 that would reduce the dimensions of the front opening of the container 10, i.e. the dimension of the front opening is the same as the dimension between the center of the side walls 14, 15. This facilitates removal of the goods (such as egg cartons) from the container 10 by the consumer. Optionally, another latch can secure the front wall 18 in this retracted position to the first side wall 14.

Figure 6:
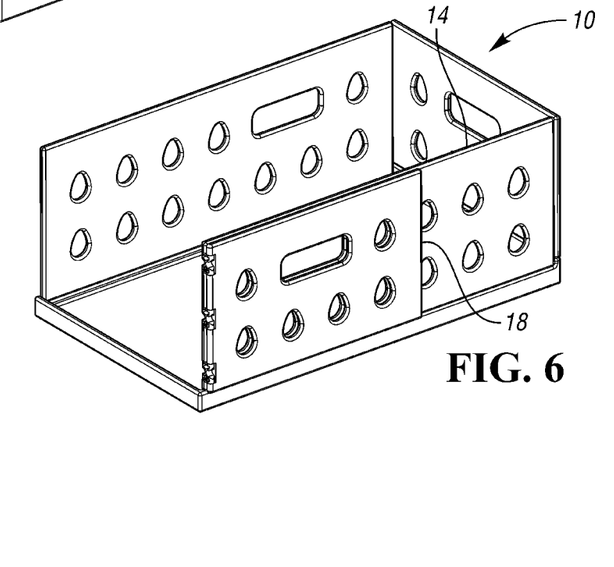
FIG. 6 shows the front wall of the container of FIG. 1 in the retracted position.

FIGS. 3-6 show the steps of pivoting the front wall 18 from the closed position (FIG. 3) to the retracted position (FIG. 6).

Figure 7:
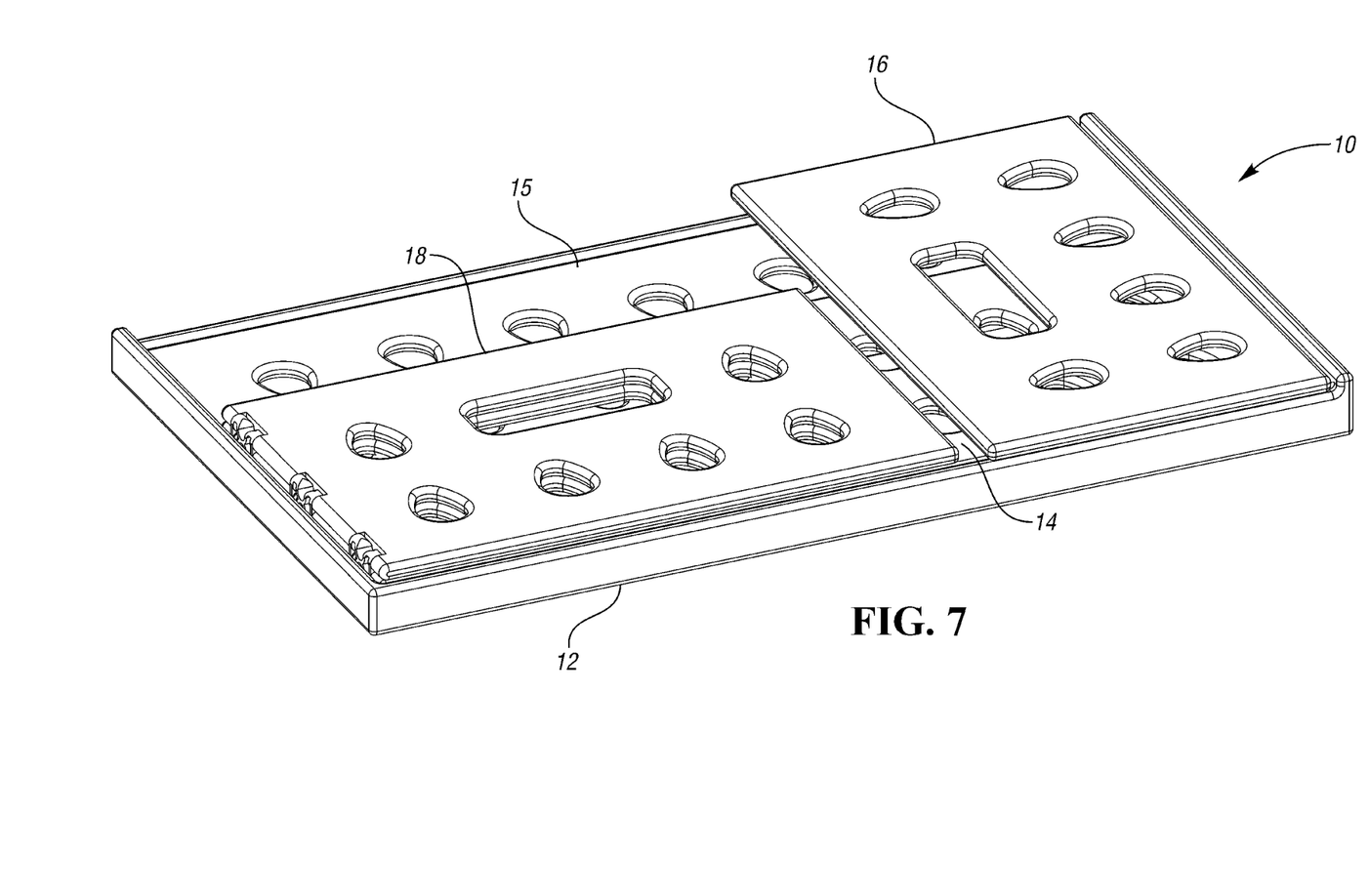
FIG. 7 shows the container of FIG. 1 in a collapsed position.

When empty, the container 10 can be collapsed as shown in FIG. 7. The front wall 18 is moved to the retracted position (FIG. 2; if not already there). The second side wall 15 is collapsed onto the base 12. The first side wall 14 and attached front wall 18 are then pivoted down onto the second side wall 15. The rear wall 16 is then pivoted onto the first side wall 14, but preferably is adjacent to, not on top of, the front wall 18 to reduce the overall height. In the collapsed position, the container 10 occupies very little volume and can be shipped back to the warehouse or central location for reloading with goods for sale.

Figure 8:
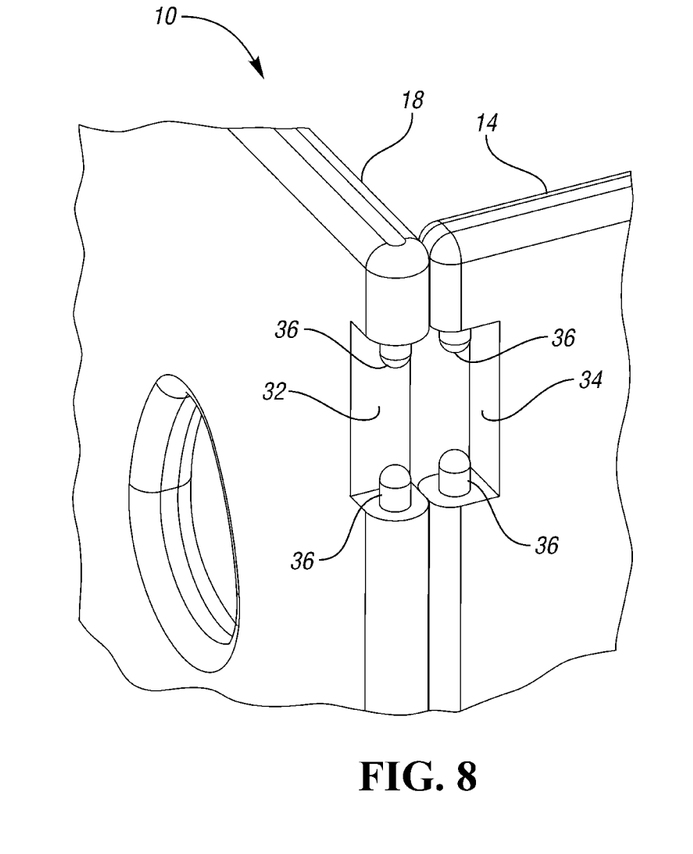
FIG. 8 is an enlarged view of one of the hinges of the container of FIG. 1, with the hinge member removed for illustration.

FIG. 8 is an enlarged view of one of the hinges 24 of the container of FIG. 1, with the hinge member 30 removed for illustration. As shown, the hinge area includes a notch or recess 32 in the side edge of the front wall 18 and an aligned notch or recess 34 in the front edge of the first side wall 14. Each recess 32, 34 includes a pair of vertical pins 36, one projecting upward and one projecting downward toward one another and axially aligned with one another.

Figure 9:
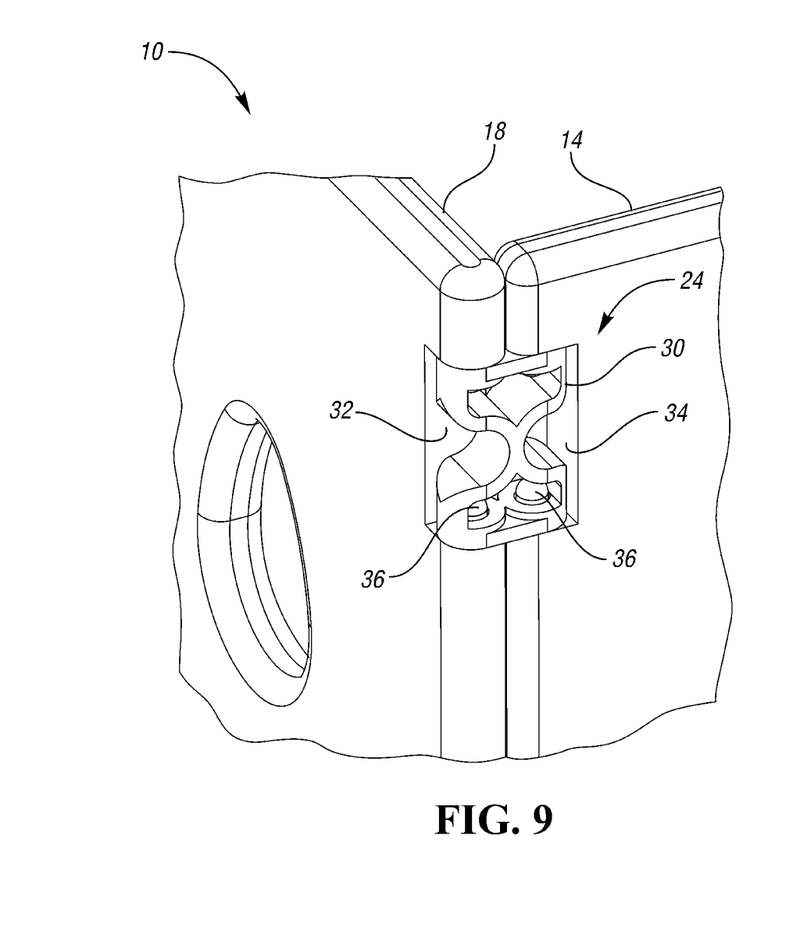
FIG. 9 shows the hinge area of FIG. 8 with the hinge member in place.

FIG. 9 shows the hinge area of FIG. 8 with the hinge member 30 in place. The hinge member 30 is partially received in the recess 32 in the front wall 18 and partially received in the recess 34 in the first side wall 14. The hinge member 30 is connected to the front wall 18 by the pair of vertical pins 36 (one shown) and is connected to the side wall 14 by the pair of vertical pins 36 (one shown). The hinge member 30 provides a double hinge (two axes of rotation) that permits the front wall 18 to pivot approximately 270 degrees.

Figure 10:
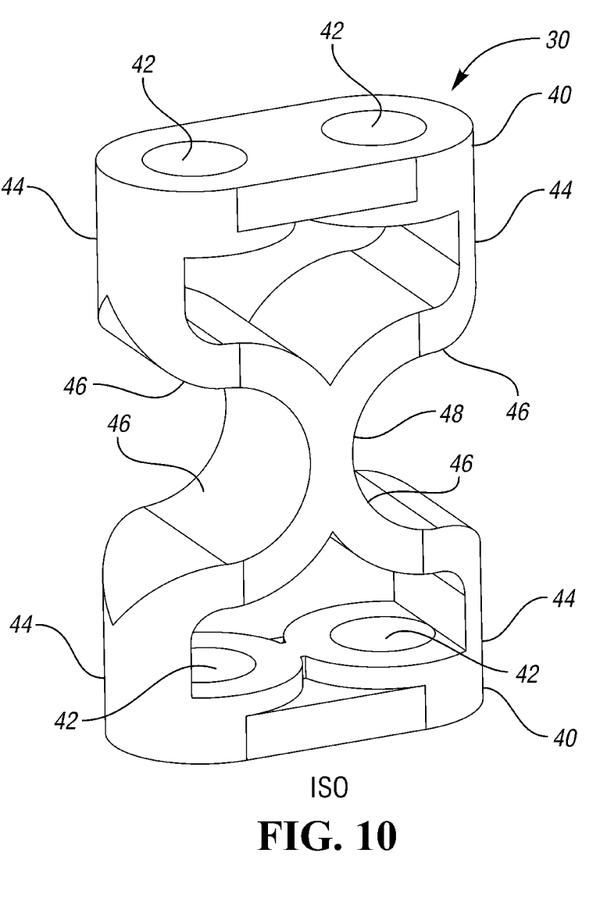
FIG. 10 is a perspective view of the hinge member of the container of FIG. 9.

FIG. 10 is a perspective view of the hinge member 30. The hinge member 30 may be injection molded as a single piece of HDPE or other suitable material. The hinge member 30 is symmetrical about its long axis and about an axis perpendicular to the long axis. The hinge member 30 includes a pair of bases 40 at opposite ends. Each base 40 has a pair of apertures 42 formed therein. Outer walls 44 extend from outer edges of each base 40 toward the outer walls 44 of the other base 40. Curved walls 46 curve inward from the outer walls 44 then curve back to a single center wall 48. The curved walls 46 provide the flexibility to the hinge member 30 sufficient to install the hinge member 30 onto the vertical pins 36 of the walls 14, 18 (FIG. 9), such as by squeezing the bases 40 toward one another to slip the vertical pins 36 of the walls 14, 18 into the apertures 42.

Figure 11:
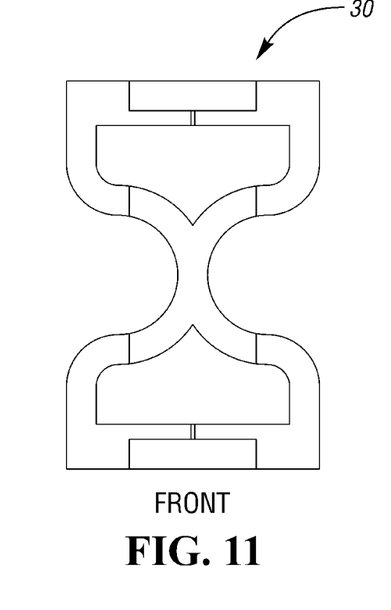
FIG. 11 is a front view of the hinge member.
Figure 12:
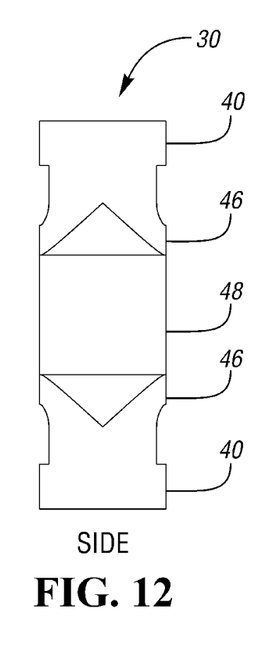
FIG. 12 is a side view of the hinge member.
Figure 13:
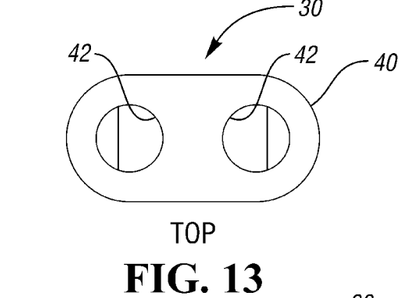
FIG. 13 is a top view of the hinge member.

FIG. 11 is a front view of the hinge member 30. FIG. 12 is a side view of the hinge member 30. FIG. 13 is a top view of the hinge member 30.

In use, the container 10 may be loaded with goods for sale, such as grocery items, such as egg cartons. A plurality of such containers 10 may be stacked and shipped to a store. At the store, the front wall 18 is then unlatched and pivoted approximately 270° out of the way. The front wall rotates 180° along the vertical axis at the corner of the egg container 10. The double hinge design of hinges 24 then rotates another 90° and allows the front wall 18 to abut the first side wall 14. The front wall 18 may be temporarily latched into a holding position along the first side wall 14 (latch not shown). The container 10 has asymmetric handle openings 20 on both side walls 14, 15. This is done to make sure the handle opening 20 on the first side wall 14 matches up with the centered handle opening 22 on the front wall 18 when it is in the retracted position (FIG. 2). The handle opening 20 on the second side wall 15 is diagonally opposite from the handle opening 20 on the first side wall 14, which still allows the load to be balanced when lifting the container 10 using both side wall handle openings 20.

Using the handle openings 20, 22, the container 10 is placed on the shelf. The open front of the container 10 faces the door of the refrigerator or cooler. The front opening of the container 10 is maximized to match the internal width of the container 10 (from first side wall 14 to second side wall 15) and makes it much easier for a customer to remove egg cartons (for example) from the container 10. When the container 10 is empty, the walls 14, 15, 16, 18 are able to fold down into a collapsed position (FIG. 7), which allows for compact storage when the container 10 is not being used. The collapsed container 10 is shipped back to the warehouse or other facility where it is reloaded and reused to ship more goods to the store.

Figure 14:
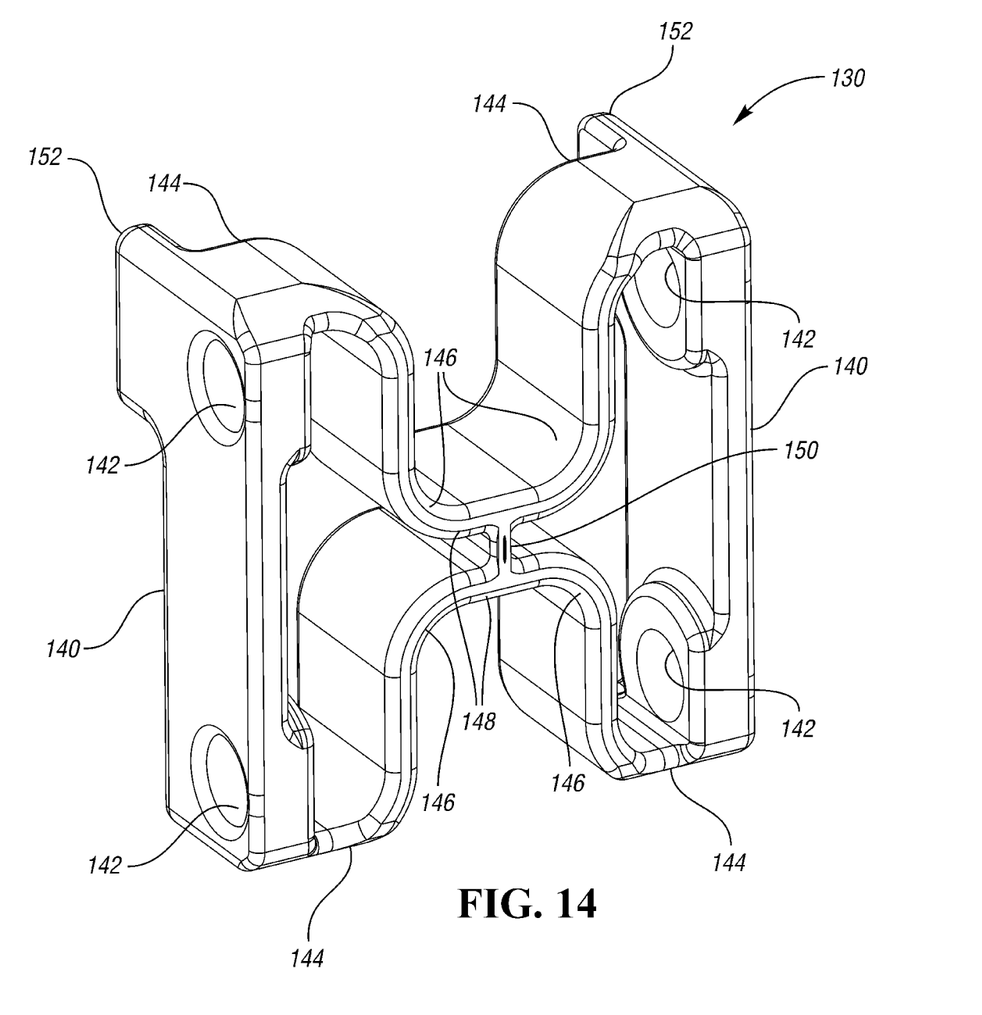
FIG. 14 is a perspective view of a hinge member according to a second embodiment.

FIG. 14 is a perspective view of a hinge member 130 according to a second embodiment. The hinge member 130 may be injection molded as a single piece of HDPE or other suitable material. The hinge member 130 is symmetrical about its long axis and about an axis perpendicular to the long axis. The hinge member 130 includes a pair of bases 140 at opposite ends. Each base 140 has a pair of apertures 142 formed therein. Outer walls 144 extend from outer edges of each base 140 toward the outer walls 144 of the other base 140. Curved walls 146 curve inward from the outer walls 144, straighten and then curve back to meet at two spaced-part center walls 148 joined by a central web 150. Each of the center walls 148 join two curved walls 146 from opposing bases 140.

Figure 15:
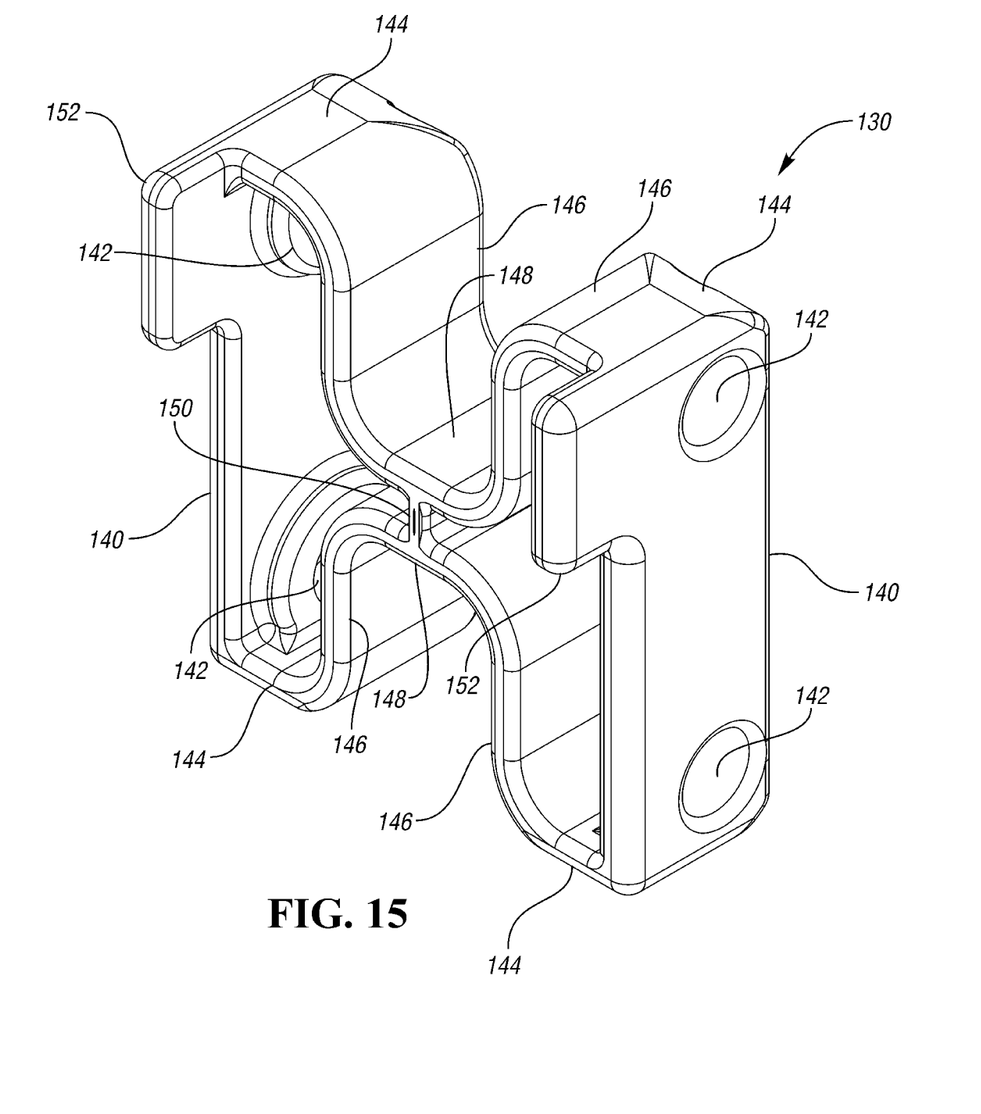
FIG. 15 is a rear perspective view of the hinge member of FIG. 14.

Shown more clearly in FIG. 15, tabs 152 project outward from each base 140, projecting generally from one of the apertures 142 in each base 140 and in a direction perpendicular to the base 140. The tabs 152 project in a direction parallel to one another.

Figure 16:
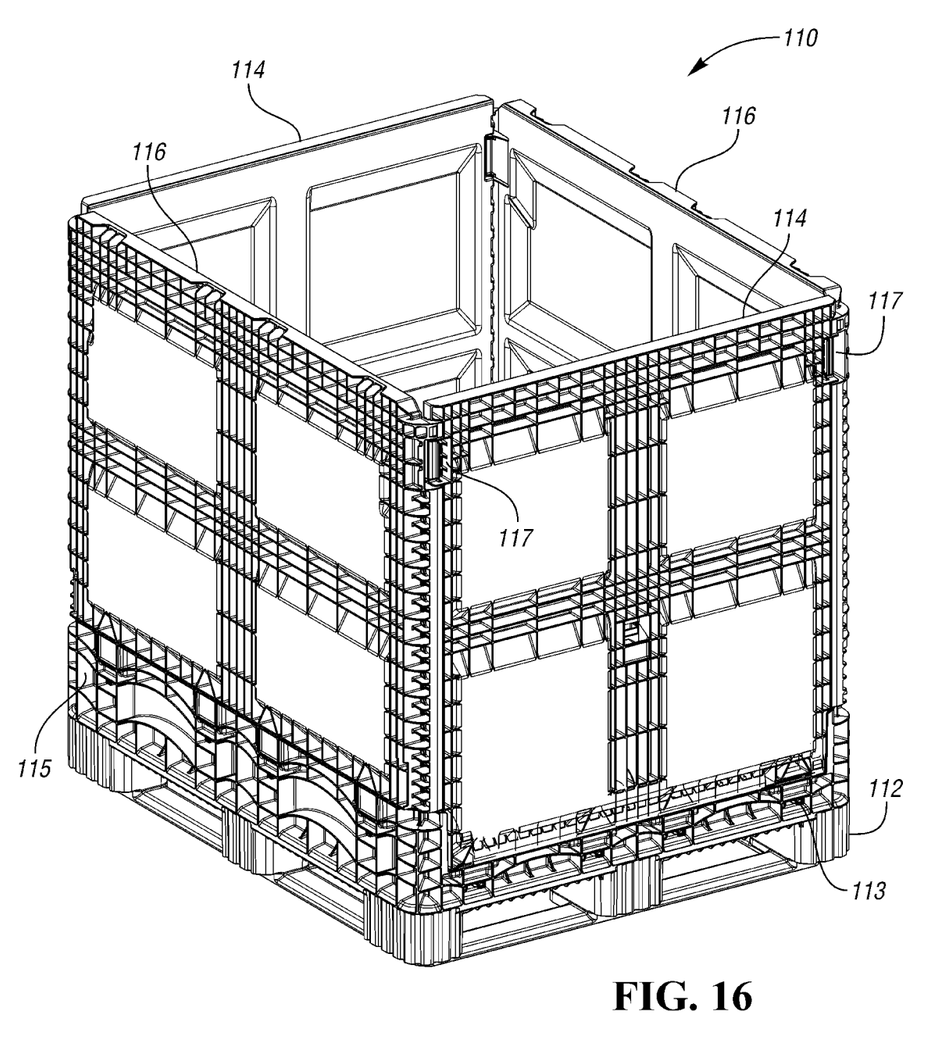
FIG. 16 is a perspective view of a collapsible bin incorporating the hinge member of FIG. 14.

FIG. 16 shows a collapsible bin 110 incorporating a plurality of the hinge members 130 (not visible in FIG. 16) of FIGS. 14-15. The bin 110 includes a pair of opposed first walls 114 pivotably secured to first upstanding flanges 113 extending upward from the base 112. The bin 110 also includes a pair of opposed second walls 116 pivotably secured to second upstanding flanges 115 extending upward from the base 112. The walls 114, 116 are selectively secured to one another in the upright position by latches 117.

Figure 17:
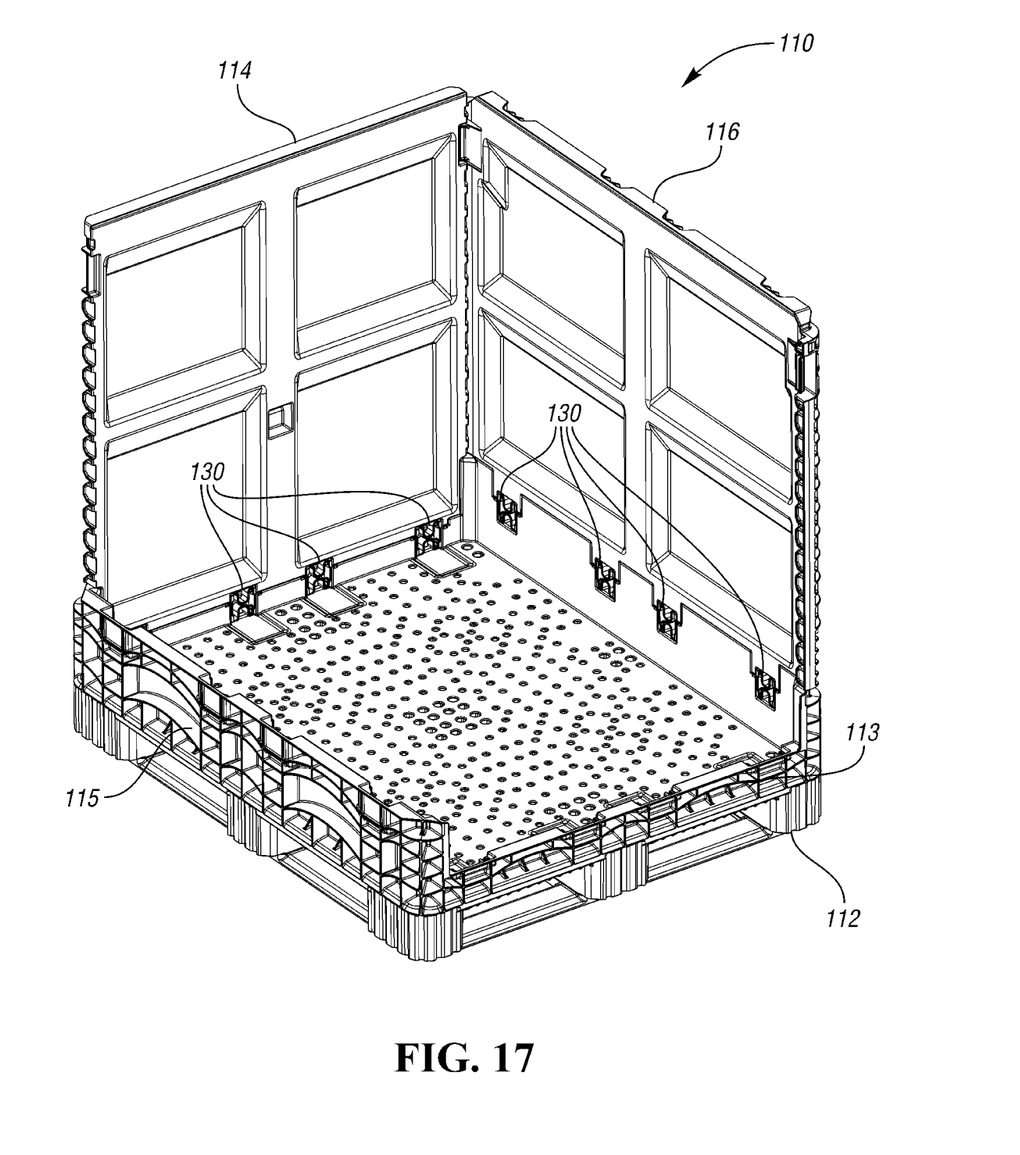
FIG. 17 is a perspective view of the bin of FIG. 16, with two walls removed for illustration, showing a plurality of the hinge members of FIG. 14 securing the walls to the base.

In FIG. 17, only two walls 14, 16 are shown for illustration. A plurality of the hinge members 130 connect the plurality of walls 114, 116 to a base 112. A plurality of the hinge members 130 connect each of the walls 114, 116 to the upstanding flanges 113, 115, respectively, on the base 112. The second upstanding flanges 115 are taller than the first upstanding flanges 113.

Figure 18:
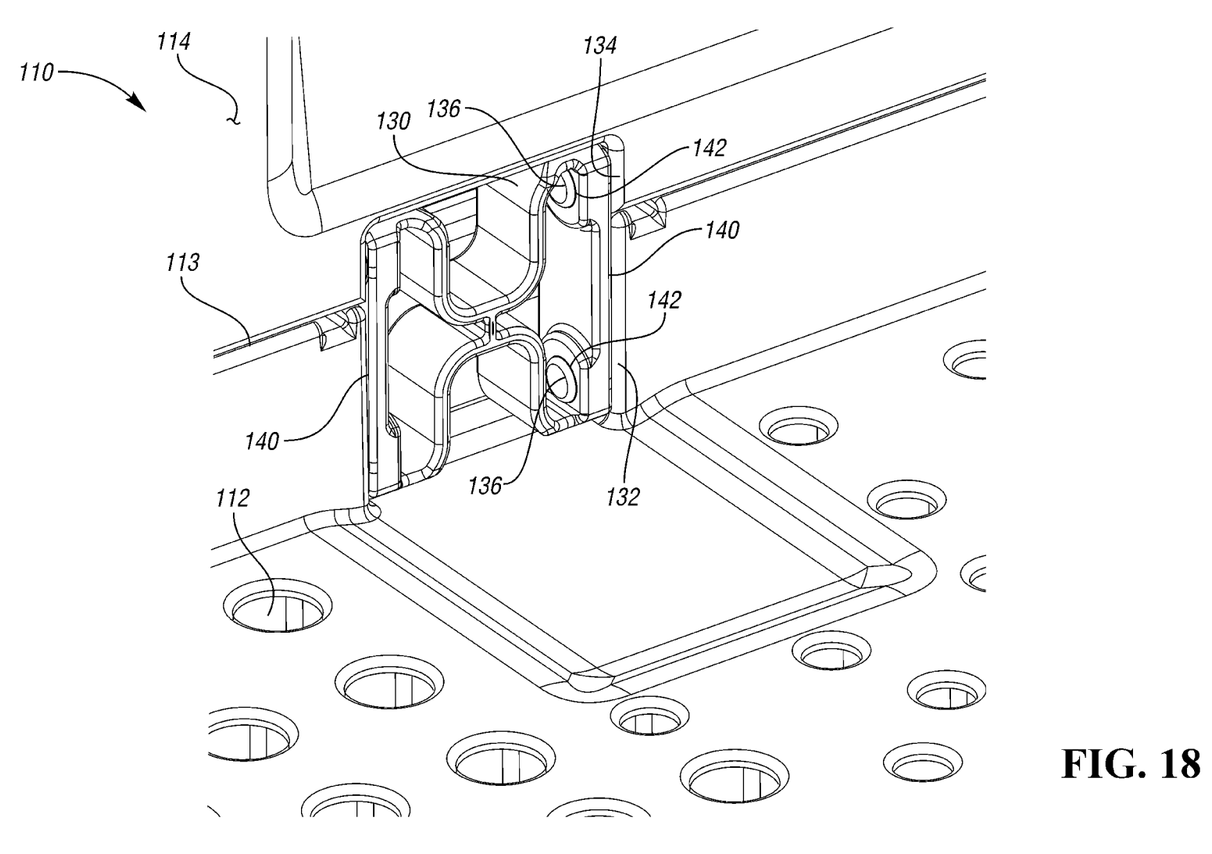
FIG. 18 is an enlarged view of a portion of FIG. 17 showing one of the hinge members securing a wall to the base.
Figure 19:
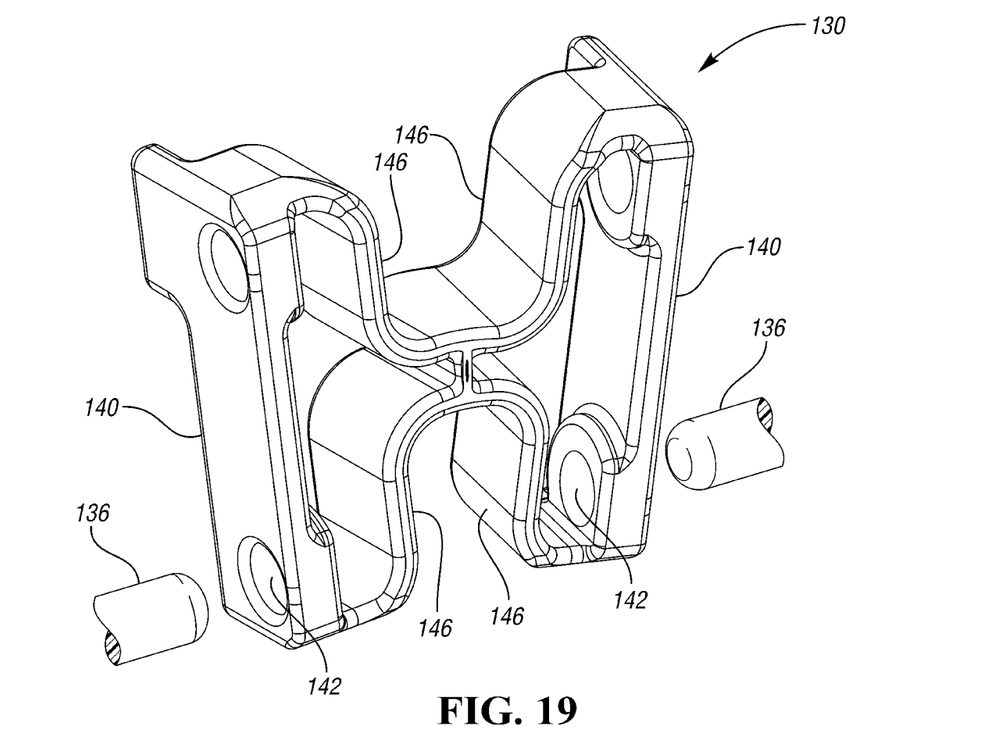
FIG. 19 illustrates a method for installing the hinge member.
Figure 20:
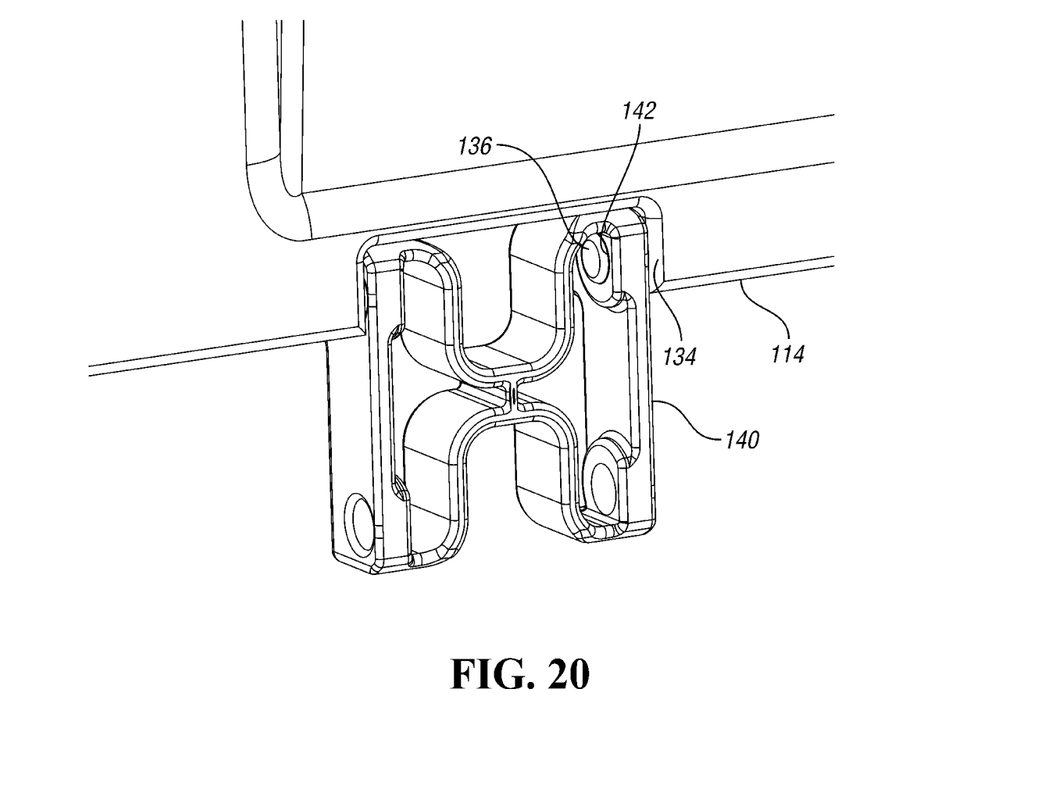
FIG. 20 shows the hinge member of FIG. 18 pivotably secured to a lower end of the wall.

FIG. 18 is an enlarged interior view of a portion of the bin 110 of FIG. 17 showing one of the hinge members 130 securing one of the first walls 114 to the base 112. The first upstanding flange 113 includes a notch or recess 132 formed therein for receiving the lower portion of the hinge member 130. The recess 132 includes a pair of pins 136 projecting toward one another into opposed apertures 142 in the opposite bases 140. Likewise, the first wall 114 includes a notch or recess 134 for receiving the upper portion of the hinge member 130. The recess 134 also includes a pair of pins 136 projecting toward one another into opposed apertures 142 in the opposite bases 140. To install the hinge member 130, the bases 140 at one end can be squeezed toward one another as shown in FIG. 19 (exaggerated for illustration). The curved walls 146 flex and bend as the apertures 142 are moved closer to one another to fit between the opposed pins 136 until the pins 136 can be aligned with the apertures 142. The hinge member 130 then returns to its original position with the bases 140 spaced further apart and with the pins 136 received in the apertures 142 as shown in FIGS. 20 (and 18). The other side of the hinge member 130 is squeezed and flexed to fit the hinge member 130 onto the other component of the bin 110 (e.g. the wall or the base, as the hinge member 30 of the first embodiment would be attached in the same manner). FIG. 20 shows the hinge member 130 of FIG. 18 pivotably secured to a lower end of the wall 114.

Figure 21:
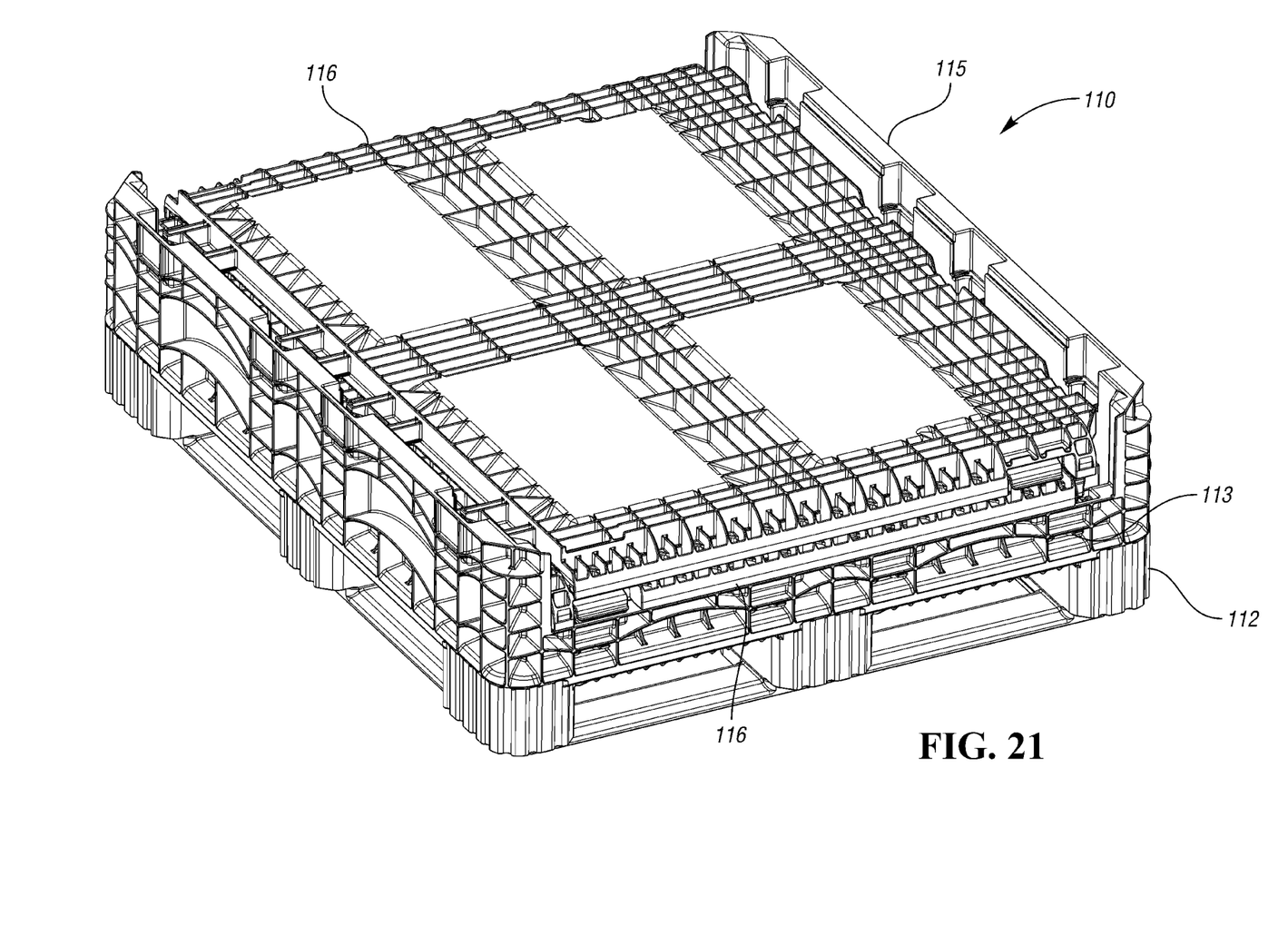
FIG. 21 shows the bin of FIG. 16 with the walls in a collapsed position.

FIG. 21 shows the bin 110 of FIG. 16 with the walls 114, 116 in a collapsed position. The walls 114, 116 are pivoted on their hinges onto the base 112.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A container comprising:
   a container base;
   a wall secured to the container base and movable between an upright position and a collapsed position on the container base, the wall including a recess formed therein, a pair of pins projecting into the recess; and
   a hinge member pivotable relative to the wall and pivotable relative to the container base, the hinge member pivotably secured to pins in the recess in the wall, the hinge member including a pair of opposed hinge member bases connected by a plurality of curved walls, the hinge member bases each including an aperture receiving one of the pair of pins in the recess.

2. The container of claim 1 wherein the aperture in each hinge member base is a first aperture, each hinge member base further including a second aperture, the second apertures of the two hinge member bases aligned with one another.

3. The container of claim 2 wherein the hinge member includes outer walls extending from each end of each hinge member base toward one another.

4. The container of claim 3 wherein the curved walls of the hinge member curve inward from each of the outer walls and then back toward a central portion of the hinge member.

5. The container of claim 1 wherein the hinge member pivotably secures the wall to the container base, wherein the hinge member is a first hinge member, the container further including a second hinge member pivotably securing the wall to the container base.

6. The container of claim 5 wherein the container base includes a pair of first upstanding flanges along opposite first edges of the container base and a pair of second upstanding flanges along opposite second edges of the container base, wherein the wall is a first wall pivotably secured to one of the first upstanding flanges.

7. The container of claim 6 wherein the second upstanding flanges are taller than the first upstanding flanges.

8. The container of claim 1 wherein the wall is a first wall, the hinge member pivotably secured to a second wall.

9. The container of claim 8 further including a third wall and a fourth wall pivotably secured to the container base and movable between an upright position and a collapsed position on the container base.

10. The container of claim 9 wherein the second wall includes a recess and a pair of pins projecting toward one another in the recess.

11. The container of claim 10 wherein the aperture in each hinge member base is a first aperture, each hinge member base further including a second aperture, the second apertures of the two hinge member bases receiving the pair of pins of the second wall.

12. The container of claim 11 wherein the hinge member includes outer walls extending from each end of each hinge member base toward one another.

13. The container of claim 12 wherein the curved walls of the hinge member curve inward from each of the outer walls and then back toward a central portion of the hinge member.

14. The container of claim 1 wherein the container base includes a pair of first upstanding flanges along opposite first edges of the container base and a pair of second upstanding flanges along opposite second edges of the container base, wherein the wall is a first wall pivotably secured to one of the first upstanding flanges.

15. The container of claim 14 wherein the second upstanding flanges are taller than the first upstanding flanges.

16. A container comprising;
   a container base;
   a first wall pivotably connected proximate a lower edge of the first wall to the container base, wherein the first wall is pivotably secured to the container base by a horizontal hinge having a pivot axis generally parallel to the container base; and
   a second wall pivotably connected proximate a lateral edge of the second wall to the first wall, wherein the second wall is pivotably secured to the first wall by a vertical hinge having a pivot axis generally perpendicular to the container base, wherein the second wall is pivotable between a use position generally perpendicular to the container base and the first wall and a retracted position adjacent the first wall and generally parallel to the first wall;
   wherein the first wall and the second wall each include a recess formed therein, a pair of first pins projecting into the recess in the first wall and a pair of second pins projecting into the recess in the second wall, the container further including a hinge member pivotably secured to the pair of first pins in the recess in the first wall and to the pair of second pins in the recess in the second wall, the hinge member including a pair of opposed hinge member bases connected by a plurality of curved walls, the hinge member bases each including an aperture receiving one of the pins.

17. The container of claim 16 wherein the first wall and the second wall include handle openings formed therethrough and wherein the second wall in the retracted position is proximate the first wall such that the handle openings are aligned.

18. A container comprising;
   a container base;
   a first wall pivotably connected proximate a lower edge of the first wall to the container base, wherein the first wall is pivotably secured to the container base by a horizontal hinge having a pivot axis generally parallel to the container base; and
   a second wall pivotably connected proximate a lateral edge of the second wall to the first wall, wherein the second wall is pivotably secured to the first wall by a vertical hinge having a pivot axis generally perpendicular to the container base, wherein the second wall is pivotable between a use position generally perpendicular to the container base and the first wall and a retracted position adjacent the first wall and generally parallel to the first wall;
   wherein the first wall and the second wall include handle openings formed therethrough and wherein the second wall in the retracted position is proximate the first wall such that the handle openings are aligned.

19. A container comprising:
   a container base;

a wall secured to the container base and movable between an upright position and a collapsed position on the container base, the wall including a recess formed therein, a pair of pins projecting into the recess; and a hinge member pivotably secured to pins in the recess in the wall, the hinge member including a pair of opposed hinge member bases connected by a plurality of curved walls, the bases each including a first aperture receiving one of the pair of pins in the recess and a second aperture aligned with the first aperture, the hinge member further including outer walls extending from each end of each hinge member base toward one another, the curved walls of the hinge member curving inward from each of the outer walls and then back toward a central portion of the hinge member.

20. The container of claim 19 wherein the container base includes a pair of first upstanding flanges along opposite first edges of the container base and a pair of second upstanding flanges along opposite second edges of the container base, wherein the wall is a first wall pivotably secured to one of the first upstanding flanges, wherein the second upstanding flanges are taller than the first upstanding flanges.

* * * * *